United States Patent [19]

Parulski

[11] Patent Number: 5,177,698

[45] Date of Patent: Jan. 5, 1993

[54] SELECTABLE POWER OF TWO COEFFICIENT SIGNAL COMBINING CIRCUIT

[75] Inventor: Kenneth A. Parulski, Rochester, N.Y.

[73] Assignee: Eastman Kodak Company, Rochester, N.Y.

[21] Appl. No.: 895,434

[22] Filed: Jun. 5, 1992

Related U.S. Application Data

[63] Continuation of Ser. No. 549,846, Jul. 9, 1990, abandoned.

[51] Int. Cl.5 .............................................. G06F 7/38
[52] U.S. Cl. ............................................................ 364/723
[58] Field of Search ................... 364/723, 754, 715.01; 358/21 R

[56] References Cited

U.S. PATENT DOCUMENTS

| 4,654,710 | 3/1987 | Richard | 358/169 |
| 4,760,469 | 7/1988 | Biber et al. | 358/310 |
| 4,817,047 | 3/1989 | Nishitani et al. | 364/754 |
| 4,891,779 | 1/1990 | Hasebe | 364/754 |
| 4,951,244 | 8/1990 | Meyer | 364/723 |
| 4,975,866 | 12/1990 | Aoki et al. | 364/723 |
| 5,008,739 | 4/1991 | D'Luna et al. | 358/21 R |
| 5,020,014 | 5/1991 | Miller | 364/723 |

OTHER PUBLICATIONS

J. Anthony Parker, Robert V. Kenyon, and Donald E. Troxel, "Comparison of Interpolating Methods for Image Resampling", *IEEE Transactions of Medical Imaging*, vol. M1-2, No. 1, Mar. 1983, pp. 31-39.

*Primary Examiner*—Long T. Nguyen
*Attorney, Agent, or Firm*—Edward Dugas

[57] ABSTRACT

An interpolation circuit multiplexes inputs prior to one or more additions during an interpolation operation, thereby reducing the number of components implementing the interpolation circuit. The multiplexers apply shifted inputs to adders in a sequence that produces the desired binary based interpolated values. The interpolation circuit can be used to programmably produce filter coefficients.

17 Claims, 8 Drawing Sheets

D = CHROMAPIX0
C = CHROMAPIX0
B = CHROMAPIX1
A = CHROMAPIX0 + CHROMAPIX1^
X = LOCATION OF INTERPOLATED PIXEL

| INTERPOLATION FILTER | | MULTIPLEXER SELECT CONTROL VALUES | | | | | |
|---|---|---|---|---|---|---|---|
| LEFT | RIGHT | A | B | C | D | E | F |
| 0  X X X X X X X  1 | | 0 | 1 | 00 | 1 | 00 | 10 |
| 1/8  X X X X X X X  7/8 | | 0 | 1 | 10 | 1 | 10 | 10 |
| 2/8  X X X X X X X  6/8 | | 0 | 1 | 00 | 0 | 01 | 01 |
| 3/8  X X X X X X X  5/8 | | 0 | 1 | 10 | 0 | 01 | 00 |
| 4/8  X X X X X X X  4/8 | | 1 | 0 | 01 | 1 | 01 | 11 |
| 5/8  X X X X X X X  3/8 | | 1 | 0 | 00 | 0 | 01 | 00 |
| 6/8  X X X X X X X  2/8 | | 1 | 0 | 10 | 0 | 01 | 01 |
| 7/8  X X X X X X X  1/8 | | 1 | 0 | 10 | 1 | 10 | 10 |

X = LOCATION OF INTERPOLATED PIXEL

FIG. 7B

| INTERPOLATION FILTER | | | | SELECT CONTROL VALUES | | |
|---|---|---|---|---|---|---|
| LEFT 2 | LEFT 1 | RIGHT 1 | RIGHT 2 | AB | C | DE |
| 0 | 1/8  X X X  3/4 | | 1/8 | 0 | 00 | 10 |
| 0 | 1/4  X X X  5/8 | | 1/8 | 0 | 00 | 01 |
| 0 | 1/2  X X X  1/2 | | 0 | 1 | 10 | 00 |
| 1/8 | 5/8  X X X  1/4 | | 0 | 1 | 01 | 01 |

X = LOCATION OF INTERPOLATED PIXEL

FIG. 7A

SELECTABLE POWER OF TWO COEFFICIENT SIGNAL COMBINING CIRCUIT

This application is a continuation of application Ser. No. 07/549,846, filed Jul. 9, 1990, now abandoned.

CROSS REFERENCE TO RELATED APPLICATION

This application is related to U.S. Pat. No. 5,008,739, filed Feb. 13, 1989 entitled Real Time Digital Signal Processor For Producing Full Resolution Color Signals From A Multi-Color Image Sensor by Parulski et al., incorporated by reference herein.

BACKGROUND OF THE INVENTION

1. Field of the Invention

The present invention is directed to a circuit which selectably combines power of two coefficients for interpolation and filter control and, more particularly, to a circuit capable of producing a linear interpolation commonly used in digital signal processing of color signals where the invention reduces the integrated circuit chip area used by the interpolation circuit.

2. Description of the Related Art

Figure 1:
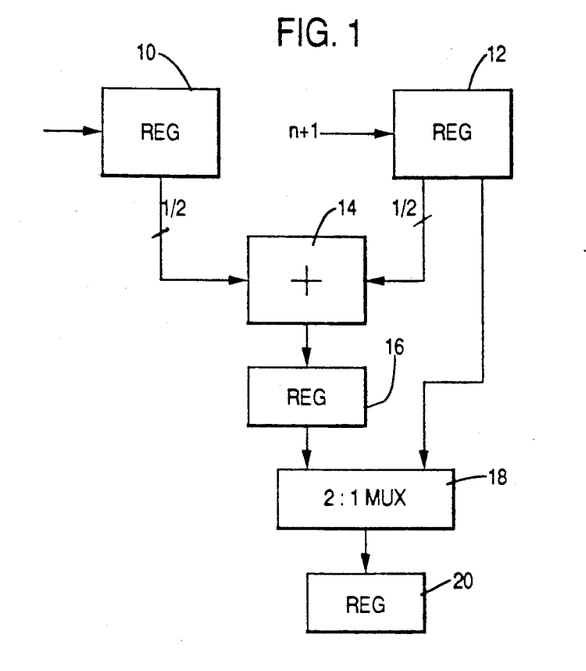
FIG. 1 illustrates a conventional 1 to 2 interpolation circuit.

Linear interpolation circuits are commonly used in digital signal processing systems, and particularly in image processing systems. The simplest form of linear interpolation is 1 to 2 interpolation. For example, an original image from a CCD camera might have 500 lines of pixels, while the printer or display may require 1,000 lines. The simplest way to obtain a 1000 line image is to simply replicate each camera line twice when displaying or printing. However, a preferred technique is to set the values of every second output line equal to the values of the original lines from the camera, and to set the values of "interpolated" lines in between the original lines equal to the average of the values from the two vertically adjacent original lines from the camera. This technique, referred to as 1 to 2 linear interpolation, can be implemented in hardware very easily using an adder, a hardwired bit shift to divide by 2, and a multiplexer, as illustrated in FIG. 1. In this figure the original pixel values from two adjacent original lines (line n and line n+1) from the camera are loaded into registers 10 and 12. Each register outputs ½ the original value by hardwired shifting. For example, if the input signal is a ten bit signal then the most significant nine bits are passed to the adder as the least significant bits of the 10 bit adder input and the most significant bit of the adder input is set to zero. In this divide by shifting type operation, if a ¼ value is needed, the two most significant bits of the next stage are set to zero and the eight most significant bits are supplied to the least significant bits of the next stage, if a ⅛ value is needed, the three most significant bits of the next stage are set to zero and only the seven most significant bits are supplied to the least significant bits of the next stage, and so on for other binary divisions. The adder 14 stores the result of the addition in a register 16. A multiplexer 18 then alternately stores either the original pixel values or the linearly interpolated values into an output register 20 depending on whether the output line number is even or odd. In this operation, the addition of the shifted original pixel values is performed before the multiplex operation.

Figure 2:
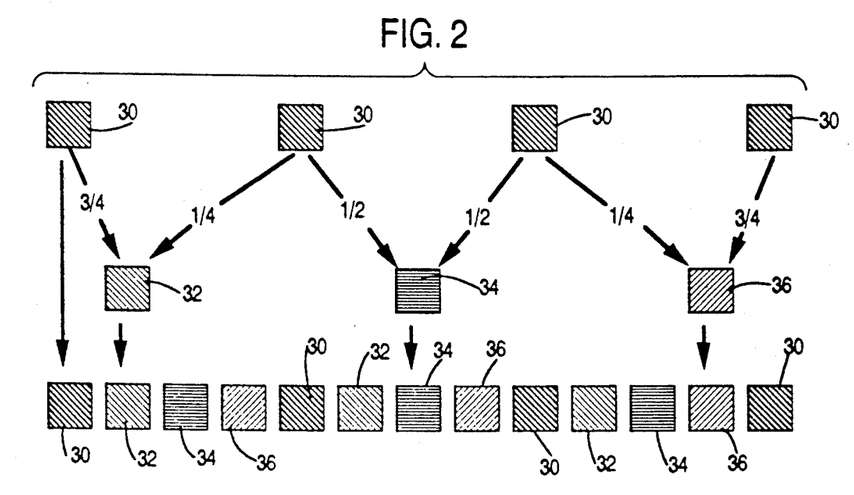
FIG. 2 illustrates a 1 to 4 interpolation operation.

A 1 to 4 linear interpolation is a common operation in many image processing applications. Two such circuits are used in a digital signal processor chip produced by Eastman Kodak Company as described in the U.S. Patent previously mentioned. The general operation of a 1 to 4 interpolation technique is illustrated in FIG. 2. For each original pixel 30 in the input image, the circuit computes four "output" pixel values. One of the output pixel values 30 equals the original pixel 30. The other three output pixel values 32, 34 and 36 are linearly weighted combinations of the values of the nearest original pixels on the left and the right, if horizontal interpolation is being performed or top and bottom if vertical interpolation is being performed. The weights are ¾ times the left pixel plus ¼ times the right pixel for the first produced pixel 32, ½ times the left pixel plus ½ times the right pixel for the second produced pixel 34, and ¼ times the left plus ¾ times the right for the third produced pixel 36.

Figure 3A:
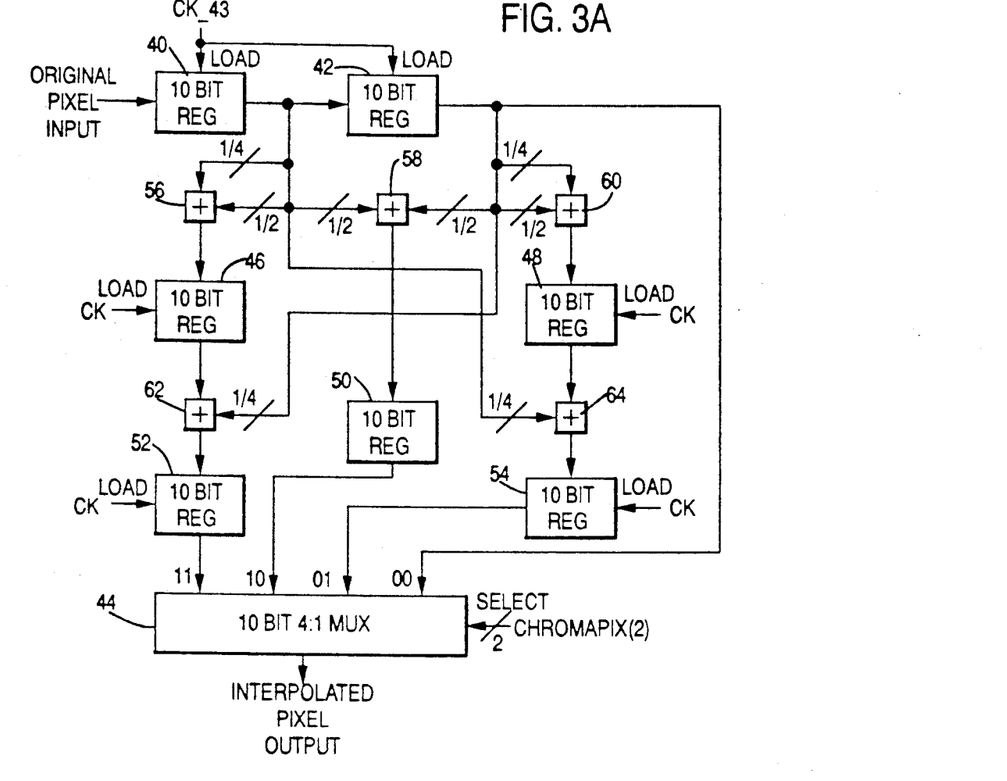
FIG. 3A depicts a conventional 1 to 4 interpolation circuit.
Figure 3B:
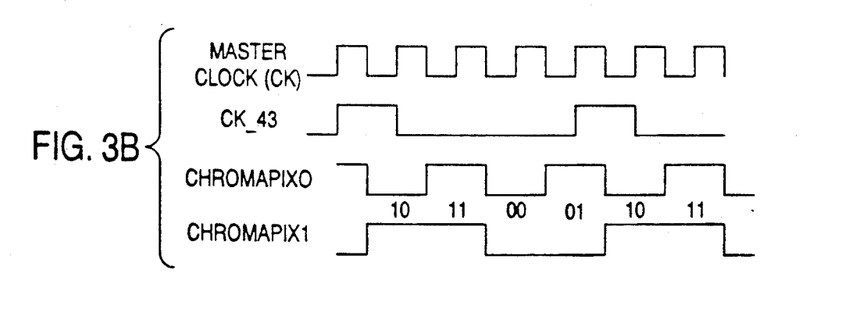
FIG. 3B is a timing diagram of the control signals for the circuit of FIG. 3A.
Figure 3C:
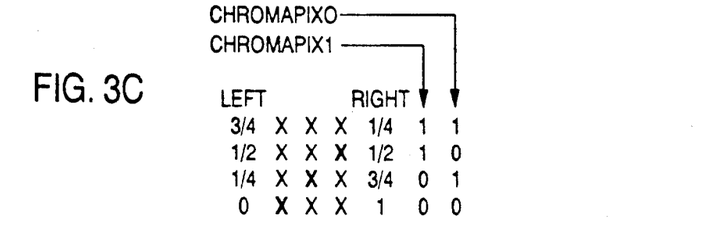
FIG. 3C is a control signal state diagram showing the interpolation coefficients of the circuit of FIG. 3A.

FIG. 3A shows one of the two identical "horizontal chroma interpolator" circuits shown as FIG. 7 of the Patent mentioned above. The two "original" pixel values are loaded into the top two registers 40 and 42 every fourth master clock cycle (See FIG. 3B). A 4 to 1 multiplexer 44 which is actually composed of three 2 to 1 multiplexers, is used to set the output equal to one of four values (See FIG. 3C). When CHROMAPIX(2)=00, the value in register 42 is used. When CHROMAPIX(2)=01, the output is set equal to ¾ of the register 42 pixel value plus ¼ of the register 40 pixel value. When CHROMAPIX(2)=10, the output equals ½ of the register 42 pixel value plus ½ of the register 40 pixel value. When CHROMAPIX(2)=11, the output equals ¾ of the register 40 pixel value plus ¼ of the register 42 pixel value. The implementation shown in FIG. 3A is the simplest prior art 1 to 4 interpolation circuit known and includes seven registers 40, 42, 46, 48, 50, 52 and 54, five adders 56, 58, 60, 62 and 64, and a 4 to 1 multiplexer or three 2 to 1 multiplexers.

Another method of performing a linear interpolation is to use multipliers and interpolation coefficients stored in registers. This approach uses even more chip area than the approach discussed above.

SUMMARY OF THE INVENTION

It is an object of the present invention to reduce the number of circuit components necessary to produce an interpolation circuit.

It is another object of the present invention to reduce the integrated circuit chip space used by the interpolation circuit.

It is also an object of the present invention to minimize the number of adders/subtractors used in an interpolation circuit.

It is a further object of the present invention to reduce the space used on an integrated circuit for an interpolation circuit by substituting multiplexers for adders.

It is an additional object of the present invention to provide an improved interpolation circuit capable of interpolation, filter coefficient programming and programmable interpolation circuit setting.

It is still another object of the present invention to produce a signal or coefficient combining circuit which is capable of producing binary combinations while reducing the necessary number of circuit components to a minimum.

The above objects can be attained by an interpolation circuit that multiplexes inputs prior to one or more additions during the interpolation operation. The multiplexers select among different divide shifted inputs and apply the shifted inputs to adders in a sequence that produces the desired binary based combined or interpolated values.

These together with other objects and advantages which will be subsequently apparent, reside in the details of construction and operation as more fully hereinafter described and claimed, reference being had to the accompanying drawings forming a part hereof, wherein like numerals reference to like parts throughout.

DESCRIPTION OF THE PREFERRED EMBODIMENTS

The present invention is based on the observation that each adder shown in the circuit of FIG. 3A is used only once every four master clock cycles, even though the adders are designed to complete an operation every master clock cycle. Therefore, the adders are essentially sitting idle 75% of the time. Furthermore, at most two adders are required to compute any of the interpolated output values. One adder is needed to sum $\frac{1}{2}$ and $\frac{1}{4}$ of a first original pixel value and a second adder is needed to sum this result with $\frac{1}{4}$ of the second original pixel value.

Figure 4:
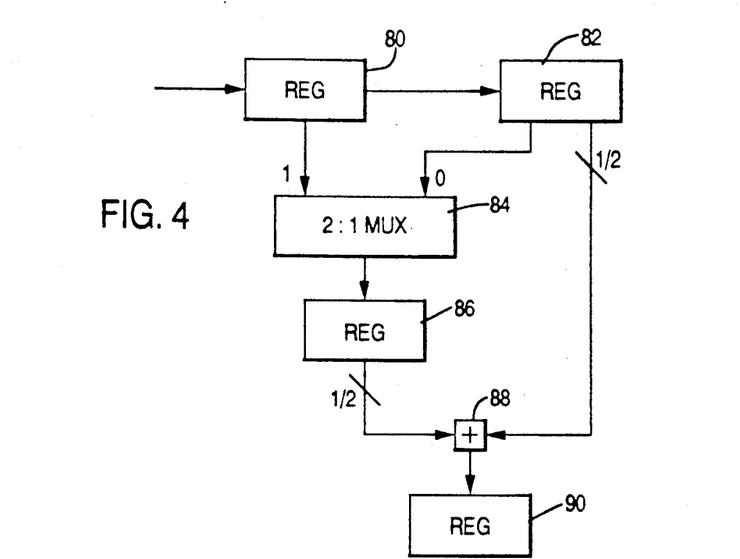
FIG. 4 depicts a 1 to 2 interpolation or signal combining circuit in accordance with the present invention.

The principle behind the present invention is to select different divide shifted signals using multiplexers before the addition operation is performed. As a result, the key to the present invention is in determining how to properly multiplex the inputs to the adders. The principle of the present invention is illustrated in FIG. 4 where two registers 80 and 82 feed a multiplexer 84 which selects one of the two registers. In a first master clock cycle, multiplexer 84 selects register 80 and stores that value in register 86. The contents of register 86 are shift divided by two and added to a shift divided output from register 82 and stored in register 90 producing the interpolated value. In the next master clock cycle multiplexer 84 selects the contents of register 82 and, as a result, register 90 receives the sum of $\frac{1}{2}$ of the value in register 82 from multiplexer 84 and $\frac{1}{2}$ of the value in register 82.

This circuit performs the multiplex operations prior to the addition operation, which is in contrast to the sequence illustrated in FIG. 1. A comparison of FIG. 1 with FIG. 4 indicates that the number of circuit components for a one to two interpolation circuit in accordance with the present invention is the same as in the conventional circuit. However, the number of circuit components necessary in the present invention begins dropping with respect to the number of circuit components required in the conventional circuit, when the number of interpolated values increases, as illustrated in FIG. 5A.

Figure 5A:
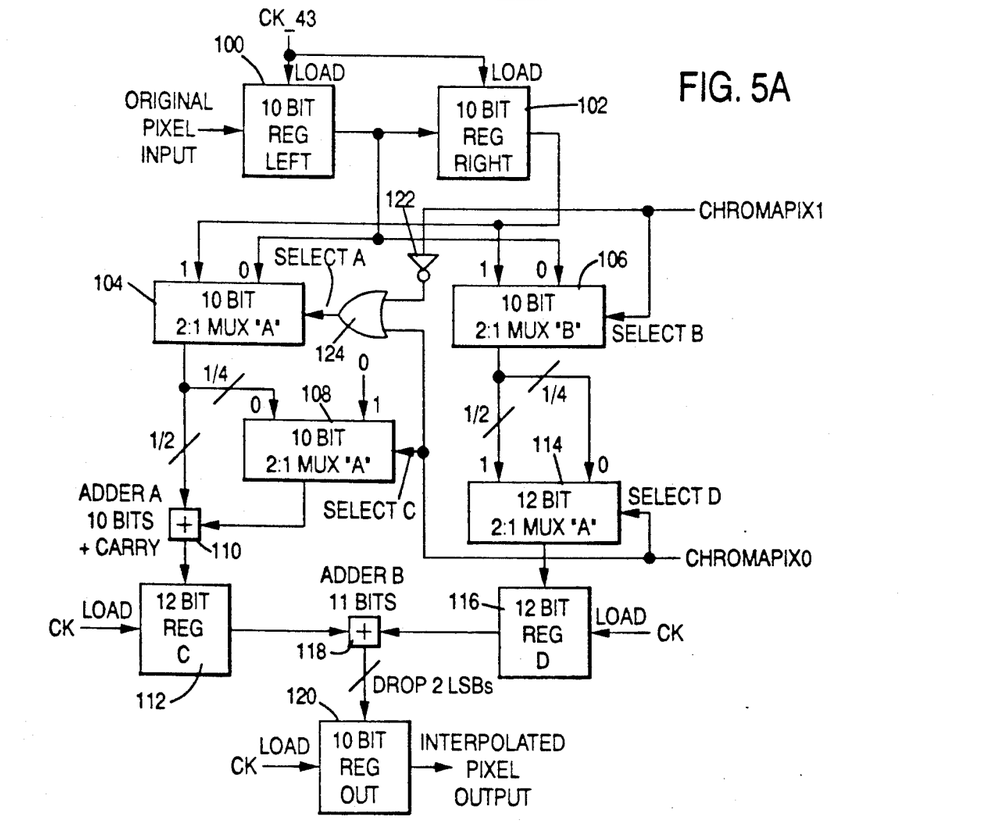
FIG. 5A illustrates a 1 to 4 interpolation circuit in accordance with the present invention.

A 1 to 4 interpolation circuit in accordance with the present invention shown in FIG. 5A requires only two adders, compared to five for the conventional circuit of FIG. 3A, and only five rather than six registers. The circuit needs four, rather than three, 2 to 1 multiplexers, one OR gate, and one invertor. Since the adders require by far the most chip area, this new circuit takes less than one-half of the area of the conventional circuit of FIG. 3A. Yet the present invention takes the same amount of time to perform the interpolation as the conventional circuit.

The circuit of FIG. 5A operates using the same clocking signals required by the conventional circuit of FIG. 3A and is a drop-in replacement for the prior art circuit. The original pixels are latched into the left and right registers 100 and 102 every four master clock (CK) cycles and four pixels are produced for every clock cycle of CK43. The A and B multiplexers 104 and 106 determine whether the left or right inputs are routed to the A and B adder inputs. The 0 and 1 values next to the inputs of the multiplexers indicate which input is selected based on the value of the select signal, for example, when select A is 1 the content of register 102 is selected and when select A is 0 the content of register 100 is selected. To set the output equal to the register 102 (right) pixel value, multiplexers A and B (104 and 106) both select (select A = 1 and select B = 1) the right register 100 output. Multiplexer C, 108 selects (select C = 0) zero as one of the adder A (110) inputs, so that the adder A (110) output to register C(112) equals $\frac{1}{2}$ the right register (100) value, while multiplexer D(114) selects (select D = 1) $\frac{1}{2}$ the right register (100) value. Thus, adder B (118) outputs to output register 120 a value which equals $\frac{1}{2}$ the value in the right register 102 plus $\frac{1}{2}$ the value in the right register 102. Of course, it is possible to just route the right register 102 directly to the output register 120, but this would require an additional multiplexer and a select line decoding circuit.

To obtain the $\frac{3}{4}$ left register value plus $\frac{1}{4}$ the right register value, multiplexer A (104) selects the left register 100 while multiplexer B (106) selects the right register 102. At the same time multiplexer C (108) selects the $\frac{1}{4}$ input, so that the register C (112) value equals $\frac{3}{4}$ left, while Multiplexer D (114) selects the $\frac{1}{4}$ input, so that the register D (116) value equals $\frac{1}{4}$ right. This gives the proper output. To obtain $\frac{1}{4}$ left plus $\frac{3}{4}$ right, the multiplexer A (104) and multiplexer B (106) selection is simply reversed. To obtain $\frac{1}{2}$ left plus $\frac{1}{2}$ right, multiplexer A (104) selects right 102 while multiplexer B (106) selects left 100. Multiplexer C (108) sets one adder A input to 0, so the output equals $\frac{1}{2}$ right, while multiplexer D (114) selects $\frac{1}{2}$, so the second adder B (118) input equals $\frac{1}{2}$ left.

Figure 5B:
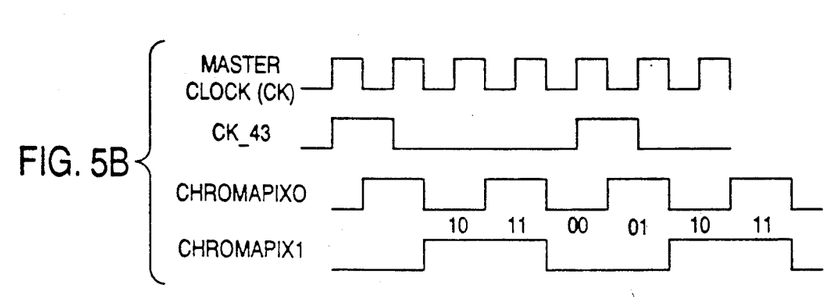
FIG. 5B is a timing diagram of the control signals for the circuit of FIG. 5A.
Figure 5C:
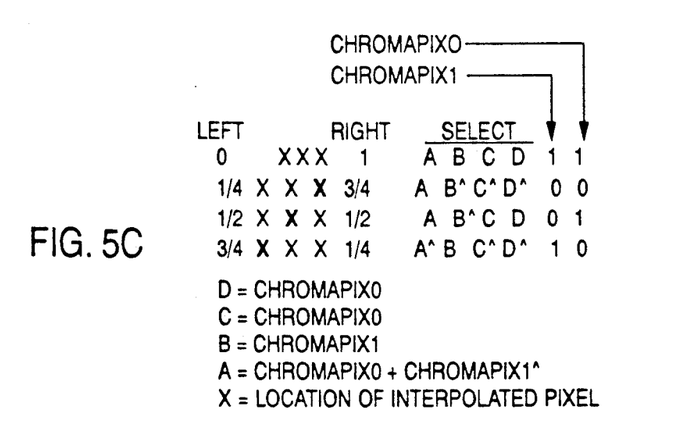
FIG. 5C is a control signal state diagram showing the interpolation coefficients of the circuit of FIG. 5A.

FIG. 5B illustrates the clock signals applied to the circuit of FIG. 5A to accomplish the above-described operation. However, as can be seen by comparing the timing signal diagrams of FIG. 3B with the corresponding diagrams in FIG. 5B, the phases of the chromapix signals needs to be adjusted, a task within the ordinary skill in the art. By making such an adjustment the output arrives at the same phase relative to CK43 as in the conventional circuit. FIG. 5C illustrates the translation of the two control signals chromapix 1 and chromapix 0 into the multiplexer selection signals A, B, C and D. As shown in FIG. 5A the present invention includes an invertor 122 along with an OR gate 124 which produces the select A signal from the control signals chromapix (2). The remaining selection signals B, C and D are unmodified control signals. The map illustrated in FIG. 5C also depicts the interpolation coefficients produced as a result of the particular state of the control signals where X is the location in the pixel stream of the produced pixel, for example, when chromapix (2)=00 the pixel adjacent to the original right pixel is produced.

Figure 6A:
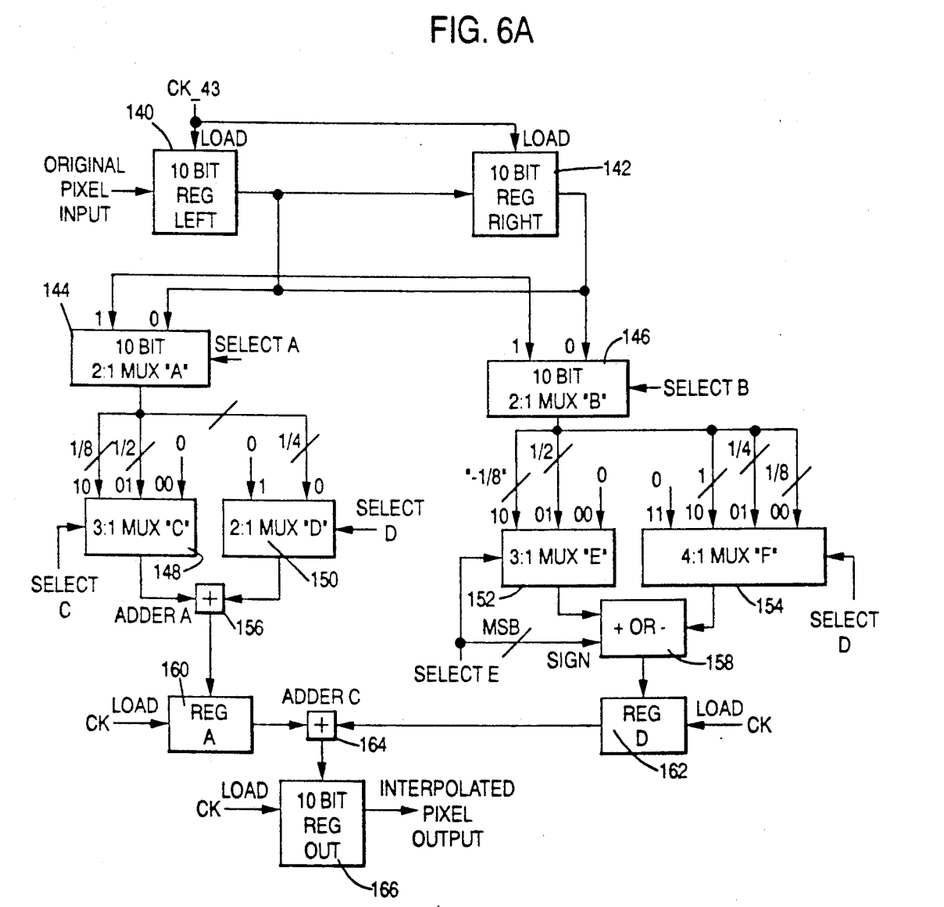
FIG. 6A depicts a 1 to 8 interpolation circuit in accordance with the present invention.

As can be seen from the above discussion, the present invention can be used to advantage any time a hardware implementation of a 1 to 4 interpolation is required. The basis of the present invention is to count the minimum number of adders needed to obtain the most adder intensive interpolated output value and then develop a circuit using this many adders along with multiplexers to appropriately provide the bit shifted or zero inputs to the adders. This approach can be extended to any other size interpolation circuit. However, a 1 to 3 interpolation circuit does not benefit from the present invention, since the $\frac{1}{3}$ plus $\frac{2}{3}$ terms are best implemented with multiplexers which have programmable coefficients instead of bit shifted additions. A 1 to 6 or 1 to 8 interpolator benefits considerably from the present invention since these interpolators would normally be implemented with multipliers. FIG. 6A illustrates how the present invention can be applied to a 1 to 8 interpolator.

Figure 6B:
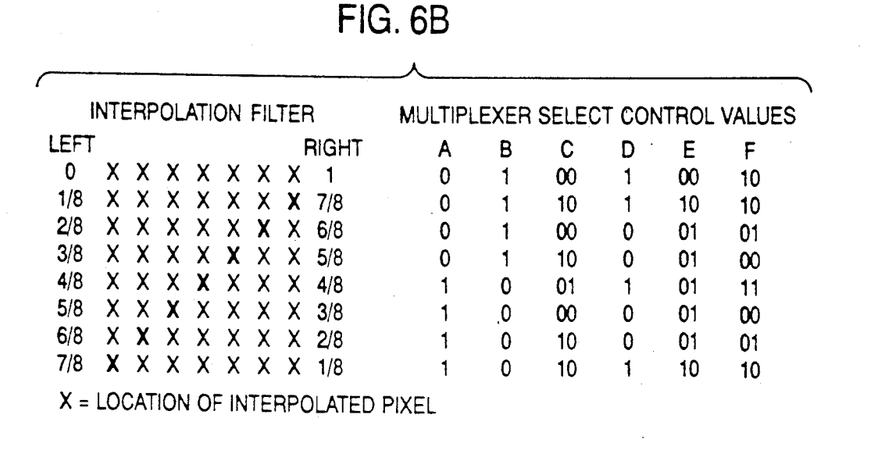
FIG. 6B is a state diagram of the control signals and interpolation coefficients for the circuit of FIG. 6A.

As illustrated in FIG. 6A, a 1 to 8 interpolator circuit in accordance with the present invention also includes two registers 140 and 142, the contents of which are selected by multiplexers 144 and 146 in a first stage. A set of second stage multiplexers 148, 150, 152 and 154 select from appropriately shifted outputs from the first stage multiplexers, or from zero values, and supply the selected values to adder 156 and adder/subtractor 158. The second stage multiplexer 152 shows a "$-\frac{1}{8}$" input value. During actual operation only a $\frac{1}{8}$ value is transferred through multiplexer 152 and the sign input to the adder/subtractor 158 is set to produce a negative input. Adders 156 and 158 supply stage storage registers 160 and 162 which feed an adder 164 that produces the output stored in register 166. The control signals, the resulting interpolation coefficients and the pixel being produced are illustrated in FIG. 6B. It is possible to produce the control signals using a logic circuit with appropriate AND, OR and inverter gates, however, with a complicated control signal set such as illustrated in FIG. 6B it would also be appropriate to provide these values from a memory storage device such as a ROM or a RAM which can be sequentially addressed by a counter incremented by a master clock signal. With the use of a programmable RAM to control the circuit of FIG. 6 it is of course possible to provide even more complicated signal combination control.

Figure 7A:
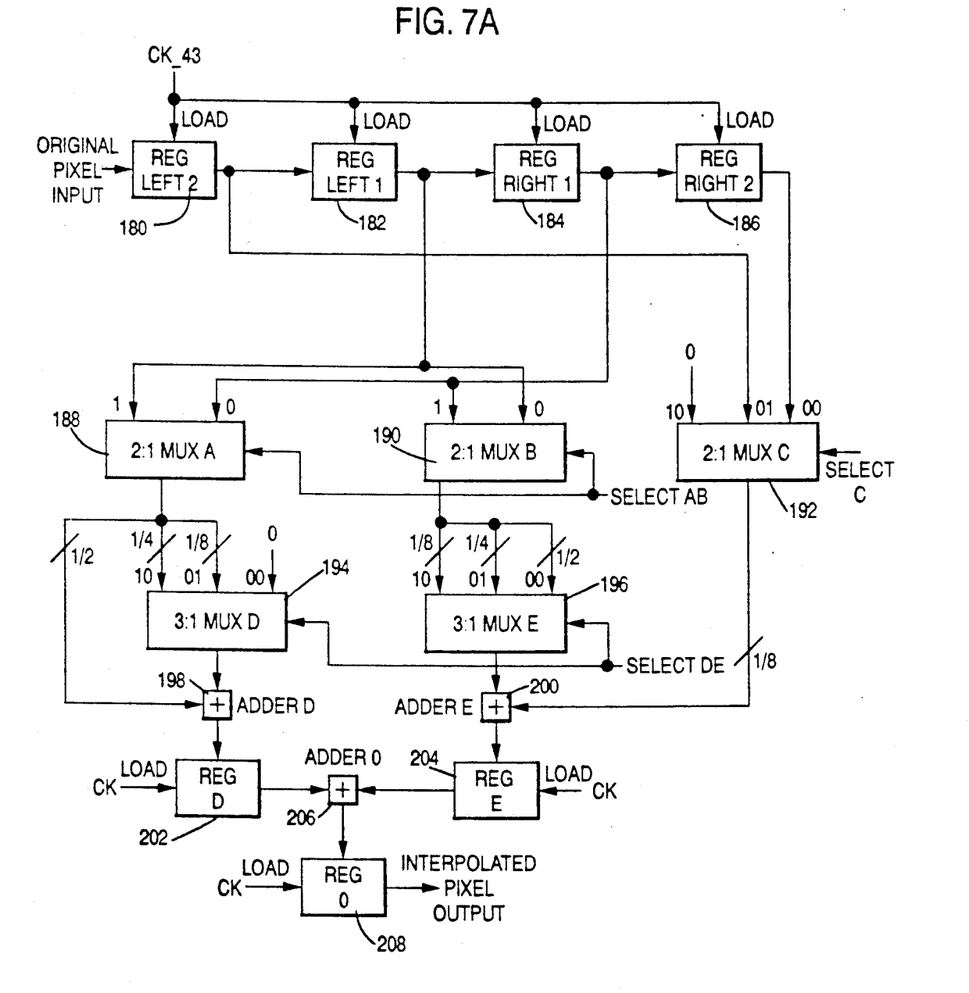
FIG. 7A is a spline interpolation circuit in accordance with the present invention.
Figure 7B:
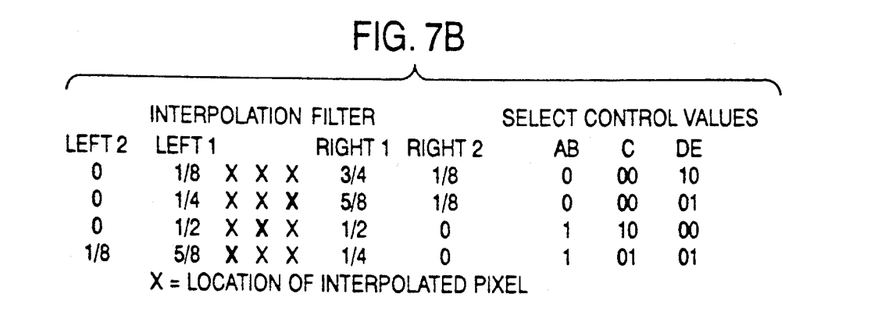
FIG. 7B is a control signal state diagram for the circuit of FIG. 7A.

FIG. 7A illustrates the present invention when applied to a spline interpolation circuit which produces four new pixels for each pixel input by using the nearest four pixels for interpolation. The filter coefficients produced by this circuit are approximations of the "Cubic-B Spline" interpolation shown in FIG. 4 of "Comparisons of Interpolating Methods For Image Resampling" by Parker et al., IEEE Transactions on Medical Imaging Vol. MI-2, No. 1, Mar. 1983. As illustrated in FIG. 7A, input storage registers 180, 182, 184 and 186 feed a first stage of multiplexers 188, 190 and 192. The outputs of the first stage of multiplexers are selected, in various divide by shift combinations, by a second stage of multiplexers 194 and 196 to be combined by adders 198 and 200 and stored in corresponding registers 202 and 204. The contents of these registers are added by adder 206 and stored in output register 208. FIG. 7B illustrates the control signal values necessary to produce the filter interpolation coefficients shown therein.

Figure 8A:
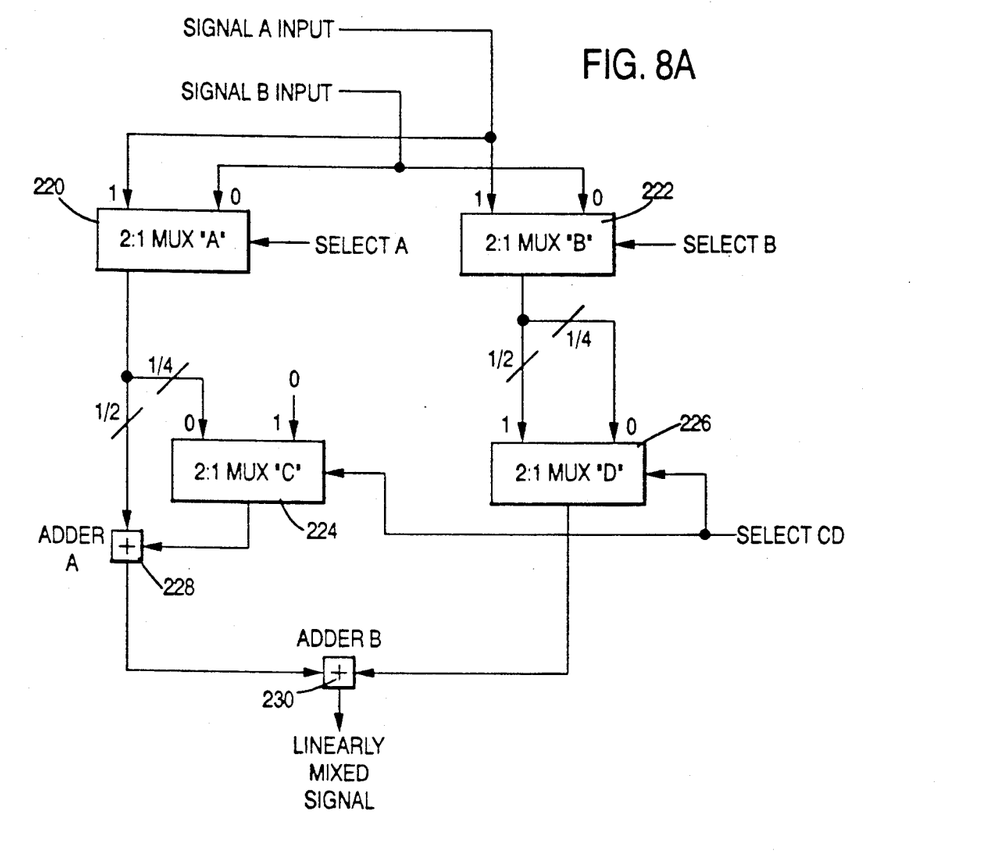
FIG. 8A illustrates a linear signal mixer in accordance with the present invention.
Figure 8B:
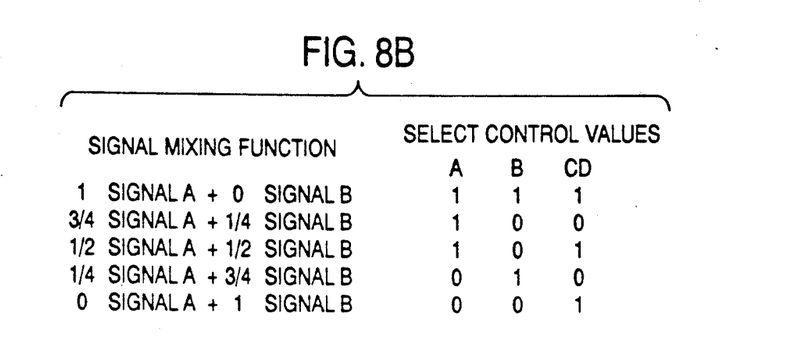
FIG. 8B illustrates the control signal state diagram for the circuit of FIG. 8A.

FIG. 8A illustrates the present invention being used as a linear signal mixer which could for example be combining images from two different image sensors or from two different sound or pressure transducers. In this embodiment first stage multiplexers 220 and 222 feed second stage multiplexers 224 and 226 which supply shift divided input signals to adders 228 and 230 which produce the linearly mixed output signal. FIG. 8B illustrates the control signal values which produce the indicated linear combinations of the input signals. Once again this can be a programmable set of control signals stored in a ROM or RAM or implemented as an appropriate logic circuit.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A combining circuit for combining input signals, comprising:
    means for bit shifting the input signals, said means for bit shifting comprising hardwired bit lines providing a pair of hardwired signals, the pair selected from among one of a first pair of bit shifted input signals and a second pair of a bit shifted input signal and a bit input signal unshifted;
    means, connected to said hardwired bit lines, for selecting the hardwired signals to produce selected outputs; and
    means, connected to said means for selecting, for adding the selected outputs to produce an output signal.

2. A combining circuit as recited in claim 1, wherein:
    said circuit further comprises input registers connected to said means for bit shifting;
    said means for adding comprises adders having inputs receiving the selected outputs; and
    said means for selecting comprises multiplexers connected to said adders and said means for bit shifting.

3. A circuit as recited in claim 1, wherein:
    said circuit further comprises first and second input registers connected to said means for bit shifting;
    said means for adding comprises first and second adders where an output of said first adder is provided to said second adder; and
    said means for selecting comprises multiplexers connected to said adders and said means for bit shifting provides, through said means for selecting, a bit shifted output of said input registers to one of said adders.

4. A circuit as recited in claim 1, wherein:
said circuit further comprises input registers connected to said means for bit shifting;
said means for adding comprises first, second and third adders, outputs of said first and second adders being connected to inputs of said third adder; and
said means for selecting comprising multiplexers connected to said adders and said means for bit shifting provides, through said means for selecting, a first bit shifted output of a first one of said input registers to said first adder and providing a second bit shifted output of a second one of said input registers to said second adder.

5. A circuit as recited in claim 1, wherein:
said means for adding comprises adders having inputs receiving the divided outputs; and
said means for selecting comprises multiplexers connected to said means for bit shifting, and said means for bit shifting provides, though said means for selecting, a bit shifted output comprised of one of said input signals to one of said adders.

6. A circuit as recited in claim 1, wherein said means for bit shifting passes most significant bits from the input signals as less significant bits of the hardwired signals.

7. A combining circuit for combining input signals, comprising:
input registers connected in series;
means for multiplexing the input signals to produce multiplexed outputs;
means for shift dividing the multiplexed outputs to produce divided outputs; and
means for adding the divided outputs to produce an output signal, said adder means comprising adders receiving the divided outputs and said multiplex means comprising multiplexers connected between said input registers and said adders and at least one of said multiplexers providing a bit shifted output of one of said input registers to one of said adders.

8. A combining circuit for combining input signals, comprising:
first and second input registers connected in series;
means for multiplexing the input signals to produce multiplexed outputs, said means for multiplexing comprising:
a 2 to 1 multiplexer connected to said first and second input registers; and
a storage register connected to said multiplexer;
means for shift dividing the multiplexed outputs to produce divided outputs; and
means for adding the divided outputs to produce an output signal, said means for adding comprising an adder connected to said second input register and said means for shift dividing.

9. A combining circuit for combining input signals, comprising:
first and second input registers connected in series;
means for multiplexing the input signals to produce divided shifted outputs, said means for multiplexing comprising:
first and second multiplexers each connected to both said first and second registers;
a third multiplexer connected to said first multiplexer; and
a fourth multiplexer connected to said second multiplexer; and means for adding the divide shifted outputs to produce an output signal, said means for adding comprising:
a first adder connected to said first and third multiplexers; and
a second adder connected to said fourth multiplexer and said first adder.

10. A combining circuit for combining input signals, comprising:
means for multiplexing the input signals to produce divide shifted outputs, said means for multiplexing comprising:
first and second multiplexers each receiving the input signals;
a third multiplexer connected to said first multiplexer; and
a fourth multiplexer connected to said second multiplexer; and
means for adding the divide shifted outputs to produce an output signal, said means for adding comprising:
a first adder connected to said first and third multiplexers; and
a second adder connected to said fourth multiplexer and said first adder.

11. A binary 1 to 4 linear interpolation circuit, comprising:
a first register receiving an input signal;
a second register connected in series to said first register;
a first multiplexer connected to said first and second registers and producing a first output;
a second multiplexer connected to said first and second registers and producing a second output;
a third multiplexer connected to said first multiplexer, receiving the first output left shifted by two bits and receiving a zero input;
a fourth multiplexer connected to said second multiplexer and receiving the second output left shifted by two bits and left shifted by one bit;
a first adder connected to said third multiplexer and to said first multiplexer and receiving the first output left shifted by one bit; and
a second adder connected to said first adder and said fourth multiplexer.

12. A combining circuit for combining input signals, comprising:
first and second input registers connected in series;
means for multiplexing the input signals to produce divide shifted outputs, said means for multiplexing comprising:
first and second multiplexers each connected to both said first and second registers;
third and fourth multiplexers connected to said first multiplexer; and
fifth and sixth multiplexers connected to said second multiplexer; and
means for adding the divide shifted outputs to produce an output signal, said means for adding comprising:
a first adder connected to said third and fourth multiplexers;
an adder/subtractor connected to said fifth and sixth multiplexers; and
a second adder connected to said first adder and said adder/subtractor.

13. A combining circuit for combining input signals, comprising:

first through fourth registers connected in series;
means for multiplexing the input signals to produce divide shifted outputs, sand means for multiplexing comprising:
  a first multiplexer connected to said second and third registers;
  a second multiplexer connected to said second and third registers;
  a third multiplexer connected to said first and fourth registers;
  a fourth multiplexer connected to said first multiplexer; and
  a fifth multiplexer connected to said second multiplexer; and
means for adding the divide shifted outputs to produce an output signal, said means for adding comprising:
  a first adder connected to said first and fourth multiplexers;
  a second adder connected to said third and fifth multiplexers; and
  a third adder connected to said first and second adders.

14. A binary 1 to 8 linear interpolation circuit, comprising:
  a first register receiving an input signal;
  a second register connected in series with said first register;
  a first multiplexer connected to said first and second registers and producing a first output;
  a second multiplexer connected to said first and second registers and producing a second output;
  a third multiplexer connected to said first multiplexer, receiving the first output left shifted three bits and one bit, and receiving a zero input;
  a fourth multiplexer connected to said first multiplexer, receiving the first output left shifted two bits and receiving a zero input;
  a fifth multiplexer connected to said second multiplexer, receiving the second output left shifted one bit and three bits, and receiving a zero input;
  a sixth multiplexer connected to said second multiplexer and receiving the second output left shifted two bits and three bits, and receiving a zero input;
  a first adder connected to said third and fourth multiplexers;
  an adder/subtractor connected to said fifth and sixth multiplexers; and
  a second adder connected to said first adder and said adder/subtractor.

15. A binary spline interpolation circuit, comprising:
  first through fourth register connected in series;
  a first multiplexer connected to said second and third registers and producing a first output;
  a second multiplexer connected to said second and third registers and producing a second output;
  a third multiplexer connected to said first and fourth registers and receiving a zero input;
  a fourth multiplexer connected to said first multiplexer, receiving the first output left shifted two and three bits, and receiving a zero input;
  a fifth multiplexer connect to said second multiplexer and receiving the second output left shifted one, two and three bits;
  a first adder connected to said first and fourth multiplexers and receiving the first output left shifted one bit;
  a second adder connected to said third and fifth multiplexers; and
  a third adder connected to said first and second adders.

16. A binary linear signal mixing circuit, comprising:
  a first multiplexer connected to receive input signals and producing a first output;
  a second multiplexer connect to receive the input signals and producing a second output;
  first means for left shifting the first output by two bits to produce a first left shifted first output;
  a third multiplexer connected to said first means, receiving the first left shifted first output, and receiving a zero input;
  second means for left shifting the second output by two bits and one bit to produce a first left shifted second output and a second left shifted second output;
  a fourth multiplexer connected to said second means and receiving the first and second left shifted second outputs;
  third means for left shifting the first output by one bit to produce a second left shifted first output;
  a first adder connected to said third multiplexer and to said third means and receiving the second left shifted first output; and
  a second adder connected to said first adder and said fourth multiplexer.

17. A combining circuit, comprising:
  means for providing input signals;
  an adder having first and second inputs; and
  means for shifting the input signals, said means for shifting comprising a hardwired connection positioned between said means for providing input signals and the first and second inputs of said adder, and simultaneously providing a first bit shifted input signal to the first input shifted by a first amount and a second bit shifted input signal to the second input shifted by a second amount greater than the first amount.

* * * * *